No. 719,556. PATENTED FEB. 3, 1903.
E. BING & H. NEVILL.
TELEGRAPH INSTRUMENT.
APPLICATION FILED APR. 18, 1902.
NO MODEL.
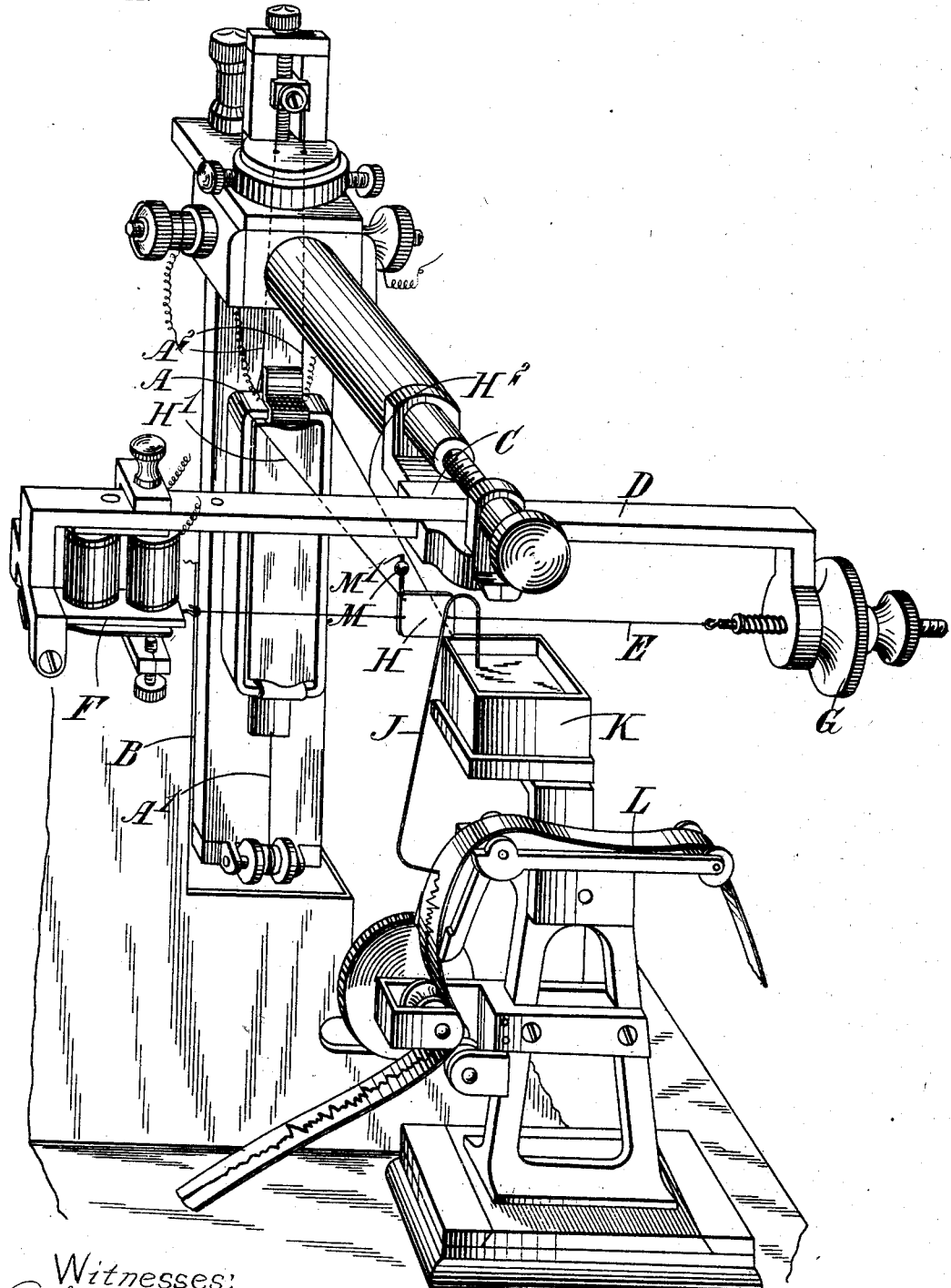

UNITED STATES PATENT OFFICE.

EDWARD BING AND HENRY NEVILL, OF PERNAMBUCO, BRAZIL.

TELEGRAPH INSTRUMENT.

SPECIFICATION forming part of Letters Patent No. 719,556, dated February 3, 1903.

Application filed April 18, 1902. Serial No. 103,597. (No model.)

*To all whom it may concern:*

Be it known that we, EDWARD BING and HENRY NEVILL, subjects of the King of England, residing at Pernambuco, Brazil, have invented certain new and useful Improvements in or Relating to Telegraph Instruments, (for which application has been made in Great Britain under No. 4,262, dated February 19, 1902,) of which the following is a specification.

This invention relates to improvements in telegraph instruments, and has special reference to those commonly known as "siphon-recorders."

The object of the invention is to increase the definition or clearness of the recorded signals, thus allowing an increase in the speed of signaling, a point of great importance in long submarine cables.

In a siphon-recorder the siphon is usually attached to a light plate or "cradle" which is supported on a stretched bridge-wire. The cradle is connected to the moving coil of the instrument in such a manner that the deflection of the coil one way or the other causes a movement of the cradle and siphon, which results in a transverse mark upon a strip continuously traveling beneath the end of the long arm of the siphon. Although the cradle and siphon are extremely light, it has been found that in instruments as hitherto made the signals become inconveniently small and indistinct if for any particular instrument a given rate of signaling is exceeded. This decrease in size and distinctness of the signals is largely due to the siphon below the bridge-wire and the neck which it contains opposing too heavy a weight to the feeble electrical currents actuating the recorder-coil.

According to this invention the signals may be considerably increased in size and definition by balancing or partially balancing those parts of the siphon and cradle below the bridge-wire, so that their tendency to act as a pendulum about the bridge-wire as a center is decreased to the desired extent and the conditions existing below the bridge-wire reproduced as nearly as is expedient above it. This is conveniently accomplished by means of a counterweight, which may be adjustable, attached, for example, to one of the upper corners of the cradle. Other methods, however, may be employed. For instance, the cradle itself may be thickened above the bridge-wire or made lighter in any suitable part.

In the accompanying drawing, which is a perspective view showing a portion of a siphon-recorder provided with a device for balancing or partially balancing the siphon according to this invention, A is a coil suspended, as at A' A², and mounted with the necessary adjusting devices upon a support B. Held in an adjustable clamp C, attached to the support B, is a cross-frame D, provided with a bridge-wire E, a vibrator F, and adjusting-nuts G for regulating the tension of the bridge-wire E.

About midway of the length of the bridge-wire E a cradle H is mounted, having one top corner connected by a fiber H' to one side of the top of the coil A and the opposite bottom corner similarly joined by a fiber H² to the other side. This cradle carries a light siphon J, the short arm of which dips into an ink-reservoir K, while the long arm extends downward, so that its end is almost in contact with a paper strip L, caused to travel continuously beneath it.

Through the action of the vibrator F the siphon makes a longitudinal mark or line upon the strip L while no current passes through the coil A; but when that coil is deflected it moves the siphon transversely across the strip one way or the other, making transverse marks, which constitute the signals.

The above-mentioned parts of the apparatus and their action are not particularly described, as they are well known in siphon-recorders. They are given by way of example and the details of construction form no part of the present invention.

It will be seen that the long arm of the siphon J when filled with ink has a tendency to oscillate as a pendulum about the bridge-wire E as a center, and to prevent this action the weight of the long arm is approximately balanced by means of a counterweight M in the form of a threaded ball or nut which can be moved up or down on a screwed rod M', attached in the construction illustrated to the top left-hand corner of the cradle H. The degree to which this balancing is carried may vary to suit particular circumstances and depends to some extent upon the rate of speed required.

Although the invention is primarily intended to be used in connection with the cradle generally employed as a convenient support for the siphon, it is to be understood that should the siphon be mounted directly on the bridge-wire the balancing may be applied to it.

What we claim as our invention, and desire to secure by Letters Patent, is—

1. In a siphon-recorder the combination of a bridge-wire, a cradle mounted on said wire, a siphon attached to the cradle, a movable coil operatively connected to the cradle, and adjustable means for approximately balancing the cradle and the siphon substantially as set forth.

2. In a siphon-recorder the combination of a bridge-wire, a cradle mounted on said wire, a siphon attached to the cradle, a movable coil operatively connected to the cradle and a weight attached to the cradle to approximately balance the weight of the long arm of the siphon substantially as set forth.

3. In a siphon-recorder the combination of a bridge-wire, a cradle mounted on said wire, a siphon attached to the cradle, a movable coil operatively connected to the cradle, a screwed rod attached to the cradle and a weight adjustable on such rod substantially as and for the purpose set forth.

4. In a siphon-recorder the combination of a bridge-wire, a cradle mounted on said wire, a siphon supported on said cradle and an adjustable balancing-weight for the siphon substantially as set forth.

5. In a siphon-recorder the combination of an oscillating siphon, a support for the siphon and adjustable means for approximately balancing the siphon substantially as set forth.

6. In a siphon-recorder, the combination with a siphon, a support for the siphon permitting it to vibrate to and from and laterally of a record-surface, and means for causing such vibration of the siphon, of adjustable means for causing the portions of the siphon on opposite sides of the axis about which it vibrates laterally to balance each other.

7. In a siphon-recorder, the combination with a siphon, a support for the siphon connected thereto relatively near one end to permit the siphon to vibrate to and from and laterally of a record-surface, and means for causing such vibrations of the siphon, of adjustable means connected with the shorter arm of the siphon for counterbalancing the weight of the longer arm thereof.

In testimony whereof we have signed our names to this specification in the presence of two subscribing witnesses.

EDWARD BING.
HENRY NEVILL.

Witnesses:
H. BACHILLERES,
C. SCHWARTZ PRYOR.